United States Patent
Bent et al.

(10) Patent No.: US 9,436,722 B1
(45) Date of Patent: Sep. 6, 2016

(54) PARALLEL CHECKSUMMING OF DATA CHUNKS OF A SHARED DATA OBJECT USING A LOG-STRUCTURED FILE SYSTEM

(71) Applicant: EMC Corporation, Hopkinton, MA (US)

(72) Inventors: John M. Bent, Los Alamos, NM (US); Sorin Faibish, Newton, MA (US); Gary Grider, Los Alamos, NM (US)

(73) Assignees: EMC Corporation, Hopkinton, MA (US); Los Alamos National Security, LLC, Los Alamos, NM (US)

( * ) Notice: Subject to any disclaimer, the term of this patent is extended or adjusted under 35 U.S.C. 154(b) by 399 days.

(21) Appl. No.: 13/799,264

(22) Filed: Mar. 13, 2013

(51) Int. Cl.
*G06F 17/30* (2006.01)

(52) U.S. Cl.
CPC .............................. *G06F 17/30371* (2013.01)

(58) Field of Classification Search
USPC ........................................................ 707/697
See application file for complete search history.

(56) References Cited

U.S. PATENT DOCUMENTS

| | | | | |
|---|---|---|---|---|
| 5,953,352 | A * | 9/1999 | Meyer ................. | G06F 11/1612 714/56 |
| 6,952,797 | B1 * | 10/2005 | Kahn .................. | G06F 11/1076 714/758 |
| 8,862,561 | B1 * | 10/2014 | Nesbit ............... | G06F 17/30348 707/698 |
| 2003/0226139 | A1 * | 12/2003 | Lee .......................... | G06F 8/65 717/176 |
| 2006/0123250 | A1 * | 6/2006 | Maheshwari ..... | G06F 17/30943 713/193 |
| 2008/0282105 | A1 * | 11/2008 | Deenadhayalan .. | G06F 11/1076 714/6.12 |
| 2009/0183056 | A1 * | 7/2009 | Aston ................. | G06F 11/1004 714/799 |

OTHER PUBLICATIONS

Los Alamos National Laboratory, "PLFS: Parallel Log Structured File System", Jan. 14, 2009.*

John Bent, Garth Gibson, Gary Grider, Ben McClelland, Paul Nowoczynski, James Nunez, Milo Polte, Meghan Wingate, "SC '09 Proceedings of the Conference on High Performance Computing Networking, Storage and Analysis", Nov. 14, 2009, ACM New York, NY, USA © 2009 Article No. 21.*

Dai et al., "ELF: An Efficient Log Structured Flash File System for Micro Sensor Nodes", ACM SensSys, Baltimore, MD (2004).*

Hartman et al., "The Zebra Striped Network File System", ACM Transactions on Computer Systems (1994).*

John H. Hartman, "The Zebra Striped Network File System", A dissertation submitted in partial satisfaction of the requirements for the degree of Doctor of Philosophy in Computer Science in the Graduate Division of the University of California at Berkeley (1994).*

Dai et al., "Elf: An Efficient Log Structured Flash File System for Micro Sensor Nodes", ACM SensSys, Baltimore, MD (2004).

John H. Hartman, "The Zebra Striped Network File System", A dissertation submitted in partial satisfaction of the requirements for the degree of Doctor of Philosophy in Computer Science in the Graduate Division of the University of California at Berkeley (1994).

* cited by examiner

*Primary Examiner* — Hosain Alam
*Assistant Examiner* — Robert F May
(74) *Attorney, Agent, or Firm* — Ryan, Mason & Lewis, LLP

(57) ABSTRACT

Checksum values are generated and used to verify the data integrity. A client executing in a parallel computing system stores a data chunk to a shared data object on a storage node in the parallel computing system. The client determines a checksum value for the data chunk; and provides the checksum value with the data chunk to the storage node that stores the shared object. The data chunk can be stored on the storage node with the corresponding checksum value as part of the shared object. The storage node may be part of a Parallel Log-Structured File System (PLFS), and the client may comprise, for example, a Log-Structured File System client on a compute node or burst buffer. The checksum value can be evaluated when the data chunk is read from the storage node to verify the integrity of the data that is read.

20 Claims, 4 Drawing Sheets

PARALLEL CHECKSUMMING OF DATA CHUNKS OF A SHARED DATA OBJECT USING A LOG-STRUCTURED FILE SYSTEM

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

CROSS-REFERENCE TO RELATED APPLICATION

This application is related to U.S. patent application Ser. No. 13/799,228, filed Mar. 13, 2013, entitled "Parallel Compression of Data Chunks of a Shared Object Using a Log-Structured File System," incorporated by reference herein

FIELD

The present invention relates to parallel storage in high performance computing environments.

BACKGROUND

Parallel storage systems are widely used in many computing environments. Parallel storage systems provide high degrees of concurrency in which many distributed processes within a parallel application simultaneously access a shared file namespace.

Parallel computing techniques are used in many industries and applications for implementing computationally intensive models or simulations. For example, the Department of Energy uses a large number of distributed compute nodes tightly coupled into a supercomputer to model physics experiments. In the oil and gas industry, parallel computing techniques are often used for computing geological models that help predict the location of natural resources. Generally, each parallel process generates a portion, referred to as a data chunk, of a shared data object.

Checksumming is a common technique to ensure data integrity. A checksum or hash sum is a fixed-size computed from a block of digital data to detect errors that may have been introduced during transmission or storage. The integrity of the data can be checked at any later time by recomputing the checksum and comparing the recomputed checksum with the stored checksum. If the two checksum values match, then the data was likely not altered.

Existing approaches apply checksums on the shared data object after it has been sent to the storage system. The checksums are applied to offset ranges on the shared data object in sizes that are pre-defined by the file system.

In parallel computing systems, such as High Performance Computing (HPC) applications, the inherently complex and large datasets increase the potential for data corruption and therefore the need for data integrity. A need therefore exists for parallel techniques for generating the checksum values and for verifying the integrity of the data.

SUMMARY

Embodiments of the present invention provide improved techniques for generating checksum values and for verifying the integrity of data. In one embodiment, a method is provided for a client executing on one or more of a compute node and a burst buffer node in a parallel computing system to store a data chunk generated by the parallel computing system to a shared data object on a storage node in the parallel computing system. The client determines a checksum value for the data chunk; and provides the checksum value with the data chunk to the storage node that stores the shared object. The data chunk can be stored on the storage node with the corresponding checksum value as part of the shared object.

The storage node may be part of a Parallel Log-Structured File System (PLFS), and the client may comprise, for example, a Log-Structured File System client executing on a compute node or a burst buffer node. The checksum value can be evaluated when the data chunk is read from the storage node to verify the integrity of the data that is read.

Advantageously, illustrative embodiments of the invention provide techniques for parallel checksumming of data being written to a shared object. These and other features and advantages of the present invention will become more readily apparent from the accompanying drawings and the following detailed description.

DETAILED DESCRIPTION

The present invention provides improved techniques for cooperative parallel writing of data to a shared object. Generally, one aspect of the present invention leverages the parallelism of concurrent writes to a shared object and the high interconnect speed of parallel supercomputer networks to generate the checksum values for the data in parallel as it is written. A further aspect of the invention leverages the parallel supercomputer networks to provide improved techniques for verifying the integrity of the checksummed data.

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices. As used herein, the term "files" shall include complete files and portions of files, such as sub-files or shards.

Figure 1:
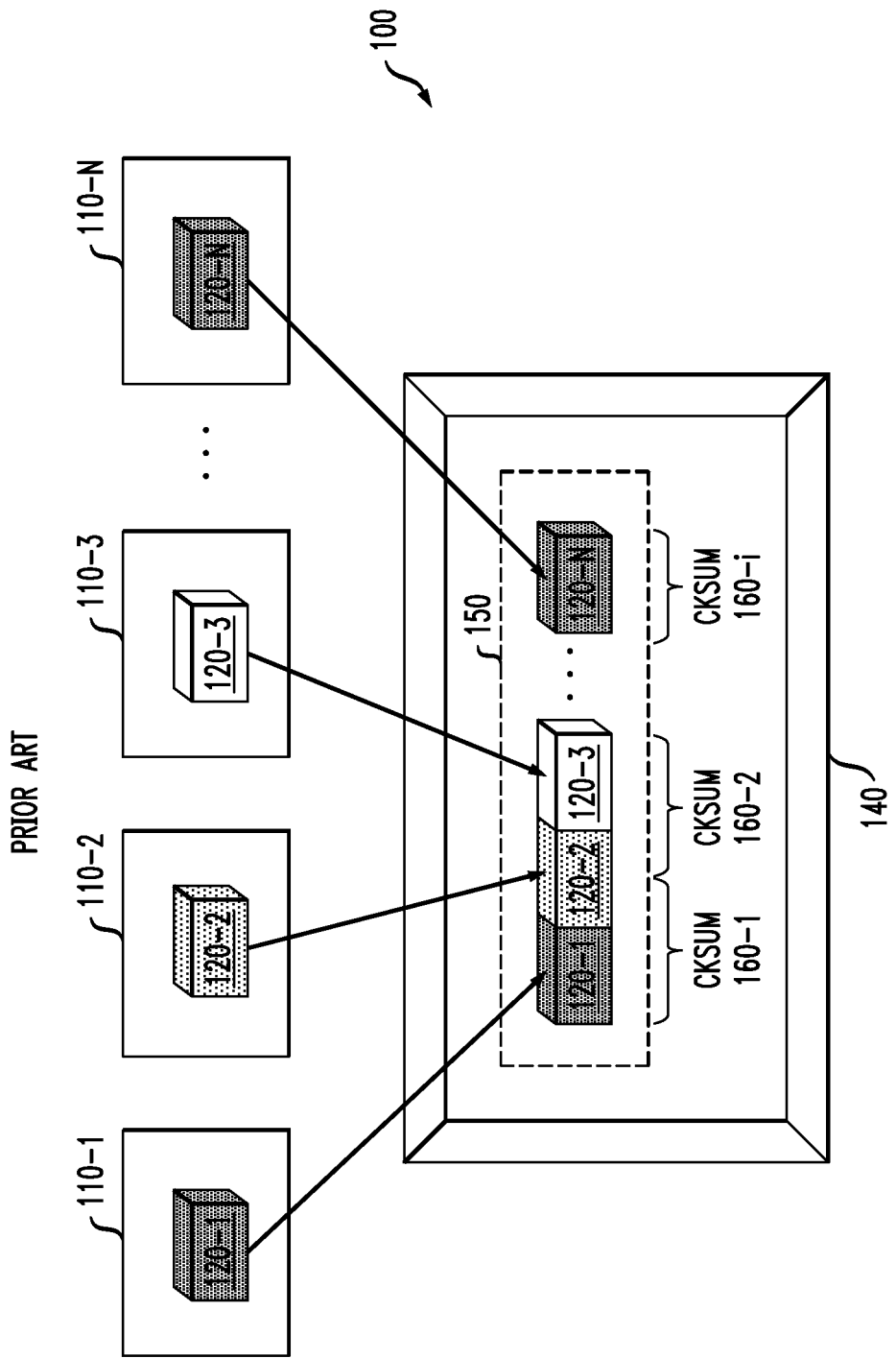
FIG. 1 illustrates an exemplary conventional technique for generating checksums of data being stored to a shared object by a plurality of processes in a storage system.

FIG. 1 illustrates an exemplary conventional storage system 100 that employs a conventional technique for generating checksums of data being stored to a shared object 150 by a plurality of processes. The exemplary storage system 100 may be implemented, for example, as a Parallel Log-Structured File System (PLFS) to make placement decisions automatically, as described in U.S. patent application Ser. No. 13/536,331, filed Jun. 28, 2012, entitled "Storing Files in a Parallel Computing System Using List-Based Index to Identify Replica Files," (now U.S. Pat. No. 9,087,075), incorporated by reference herein, or it can be explicitly controlled by the application and administered by a storage daemon.

As shown in FIG. 1, the exemplary storage system 100 comprises a plurality of compute nodes 110-1 through 110-N (collectively, compute nodes 110) where a distributed application process generates a corresponding portion 120-1 through 120-N of a distributed shared data structure 150 or other information to store. The compute nodes 110 optionally store the portions 120 of the distributed data structure 150 in one or more nodes of the exemplary storage system 100, such as an exemplary flash based storage node 140. In addition, the exemplary hierarchical storage tiering system 100 optionally comprises one or more hard disk drives (not shown).

As shown in FIG. 1, the compute nodes 110 send their distributed data chunks 120 into a single file 150. The single file 150 is striped into file system defined blocks, and then each block is checksummed. As indicated above, existing checksum approaches apply checksums on the shared data structure 150 only after it has been sent to the storage node 140 of the storage system 100. Thus, as shown in FIG. 1, the checksums 160 are applied to offset ranges on the data in sizes that are pre-defined by the file system 100. The offset size of the checksums 160 does not typically align with the size of the data portions 120 (i.e., the file system defined blocks will typically not match the original memory layout).

Figure 2:
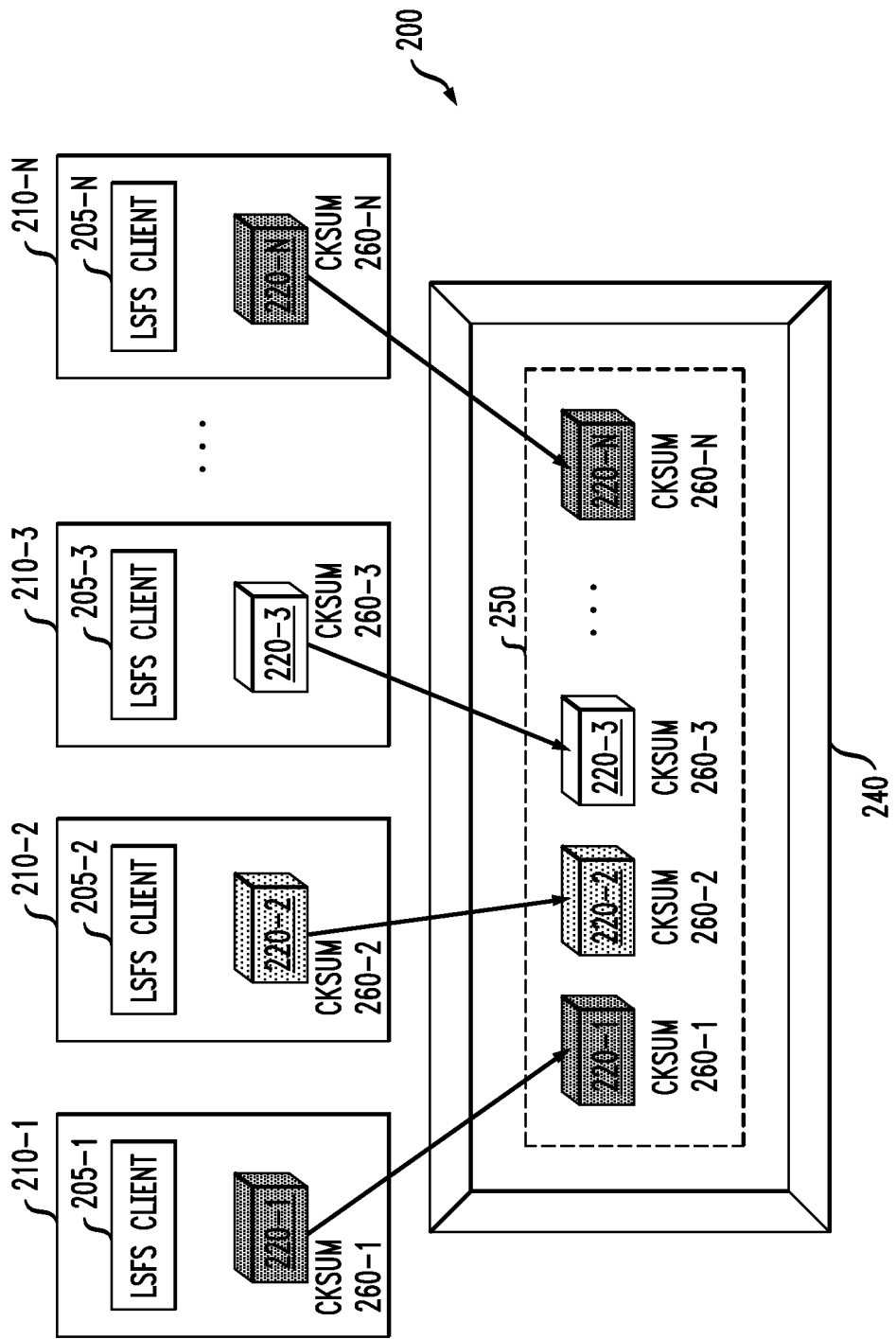
FIG. 2 illustrates an exemplary distributed technique for generating checksums of data being stored to a shared object by a plurality of processes in a storage system in accordance with aspects of the present invention.

FIG. 2 illustrates an exemplary storage system 200 that generates checksums of data chunks 220 being stored to a shared object 250 by a plurality of processes in accordance with aspects of the present invention. The exemplary storage system 200 may be implemented, for example, as a Parallel Log-Structured File System.

As shown in FIG. 2, the exemplary storage system 200 comprises a plurality of compute nodes 210-1 through 210-N (collectively, compute nodes 110) where a distributed application process generates a corresponding data chunk portion 220-1 through 220-N (collectively, data chunks 220) of a distributed shared data object 250 to store. The distributed application executing on given compute node 210 in the parallel computing system 200 writes and reads the data chunks 220 that are part of the shared data object 250 using a log-structured file system (LSFS) client 205-1 through 205-N executing on the given compute node 210. The compute nodes 210 store the data chunk portions 220 of the distributed data structure 250 in one or more storage nodes of the exemplary storage system 200, such as an exemplary LSFS server 240. The LSFS server 240 may be implemented, for example, as a flash based storage node. In addition, the exemplary hierarchical storage tiering system 200 optionally comprises one or more hard disk drives (not shown).

In accordance with one aspect of the present invention, on a write operation, each LSFS client 205 applies a checksum function to each data chunk 220 to generate a corresponding checksum value 260-1 through 260-N. Each data chunk 220 is then stored by the corresponding LSFS client 205 with the corresponding computed checksum 260 on the LSFS server 240.

In accordance with another aspect of the present invention, on a read operation, the LSFS client 205 performs a data integrity check on the read operation, where the data chunk 220 and the corresponding checksum 260 are read from the LSFS server 240 and are provided to the corresponding LSFS client 205 on the compute node 210 for the data integrity check before being sent to the application. The data integrity check comprises recomputing the checksum $260_{recompute}$ and comparing the recomputed checksum $260_{recompute}$ with the stored checksum $260_{stored}$. If the two checksum values $260_{recompute}$ and $260_{stored}$ match, then the data integrity is verified.

Figure 3:
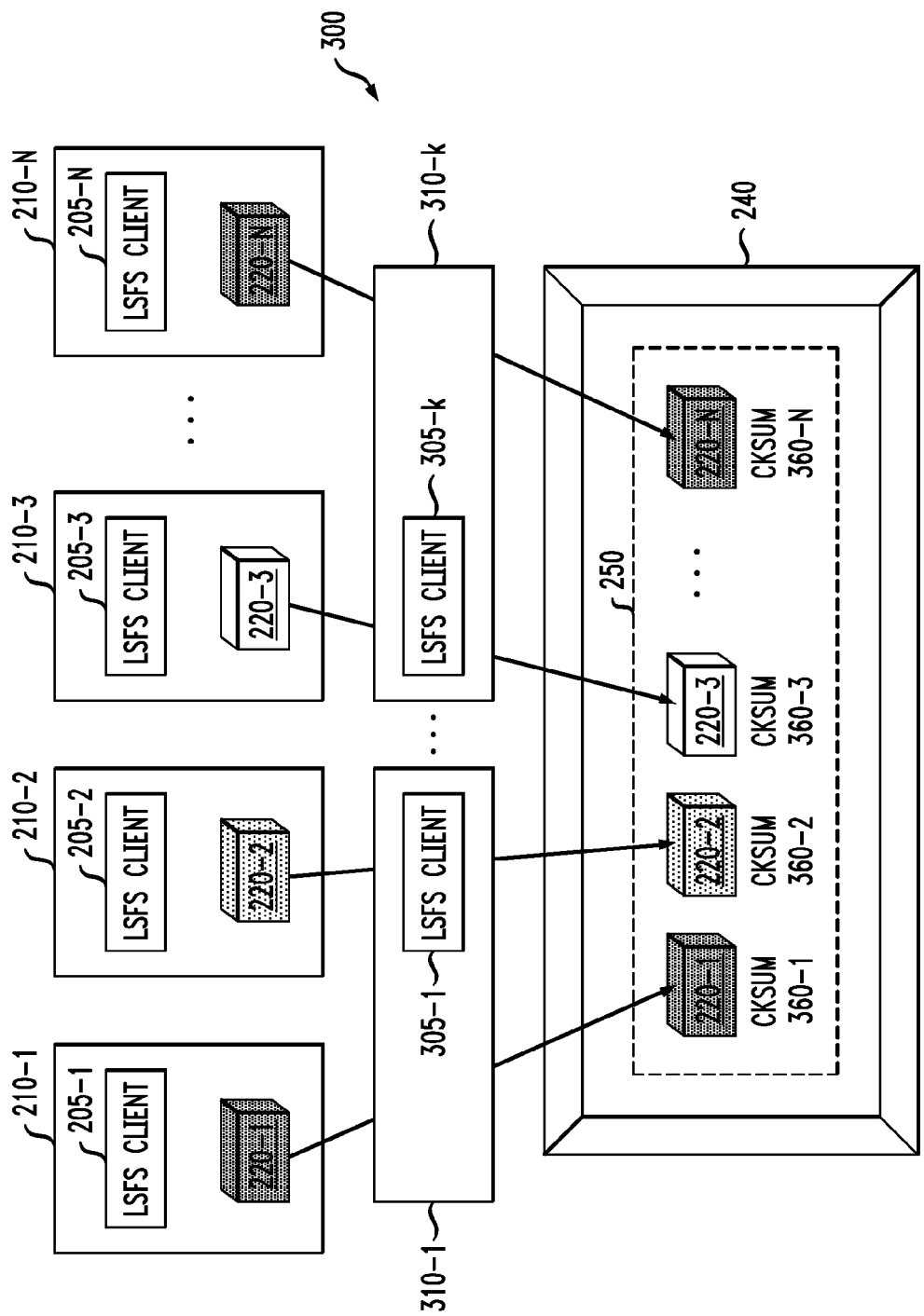
FIG. 3 illustrates an exemplary alternate distributed technique for generating checksums of data being stored to a shared object by a plurality of processes in a storage system in accordance with an alternate embodiment of the present invention.

FIG. 3 illustrates an exemplary storage system 300 that generates checksums of data chunks 220 being stored to a shared object 250 by a plurality of processes in accordance with an alternate embodiment of the present invention. The exemplary storage system 300 may be implemented, for example, as a Parallel Log-Structured File System. As shown in FIG. 3, the exemplary storage system 300 comprises a plurality of compute nodes 210-1 through 210-N (collectively, compute nodes 110) where a distributed application process generates a corresponding data chunk portion 220-1 through 220-N (collectively, data chunks 220) of a distributed shared data object 250 to store, in a similar manner to FIG. 2. The distributed application executing on given compute node 210 in the parallel computing system 200 writes and reads the data chunks 220 that are part of the shared data object 250 using a log-structured file system (LSFS) client 205-1 through 205-N executing on the given compute node 210, in a similar manner to FIG. 2. The compute nodes 210 store the data chunk portions 220 of the distributed data structure 250 in one or more storage nodes of the exemplary storage system 200, such as an exemplary LSFS server 240. The LSFS server 240 may be implemented, for example, as a flash based storage node. In addition, the exemplary hierarchical storage tiering system 200 optionally comprises one or more hard disk drives (not shown).

The exemplary storage system 300 also comprises one or more flash-based burst buffer nodes 310-1 through 310-k that process the data chunks 220 that are written by the LSFS clients 205 to the LSFS server 240, and are read by the LSFS clients 205 from the LSFS server 240. The exemplary flash-based burst buffer nodes 310 comprise LSFS clients 305 in a similar manner to the LSFS clients 205 of FIG. 2.

In accordance with one aspect of the present invention, on a write operation, each burst buffer node 310 applies a checksum function to each data chunk 220 to generate a corresponding checksum value 360-1 through 360-N. Each data chunk 220 is then stored with the corresponding computed checksum 360 on the LSFS server 240, in a similar manner to FIG. 2.

In accordance with another aspect of the present invention, on a read operation, the burst buffer node 310 performs a data integrity check on the read operation, where the data chunk 220 and the corresponding checksum 360 are read from the LSFS server 240 and are provided to the the burst buffer node 310 for the data integrity check before being sent to the application executing on the compute node 210. The data integrity check comprises recomputing the checksum $360_{recompute}$ and comparing the recomputed checksum $360_{recompute}$ with the stored checksum $360_{stored}$. If the two checksum values $360_{recompute}$ and $360_{stored}$ match, then the data integrity is verified.

On a burst buffer node 310, due to the bursty nature of the workloads, there is additional time to run computationally intensive checksumming as well as addition parity schemes, such as erasure codes, such that corrupted data can be recovered in addition to just being detected.

It is noted that the embodiments of FIGS. 2 and 3 can be combined such that checksumming is performed by the LSFS clients 205 executing on the compute nodes 210 and additional more computationally intensive checksumming and/or erasure coding is performed by the burst buffer nodes 310. A distributed signature lookup service can be established across the network of burst buffer nodes 310 to reduce the latency to verify the checksums.

While these checksums may reduce performance due to latency, this is outweighed by the improved reliability obtained from the additional data integrity. Additionally, on the burst buffer nodes 310, this additional latency will not be incurred by the application since the latency will be added not between the application on the compute nodes 210 and the burst buffer nodes 310 but between the asynchronous transfer from the burst buffer nodes 310 to the lower storage servers 240.

Figure 4:
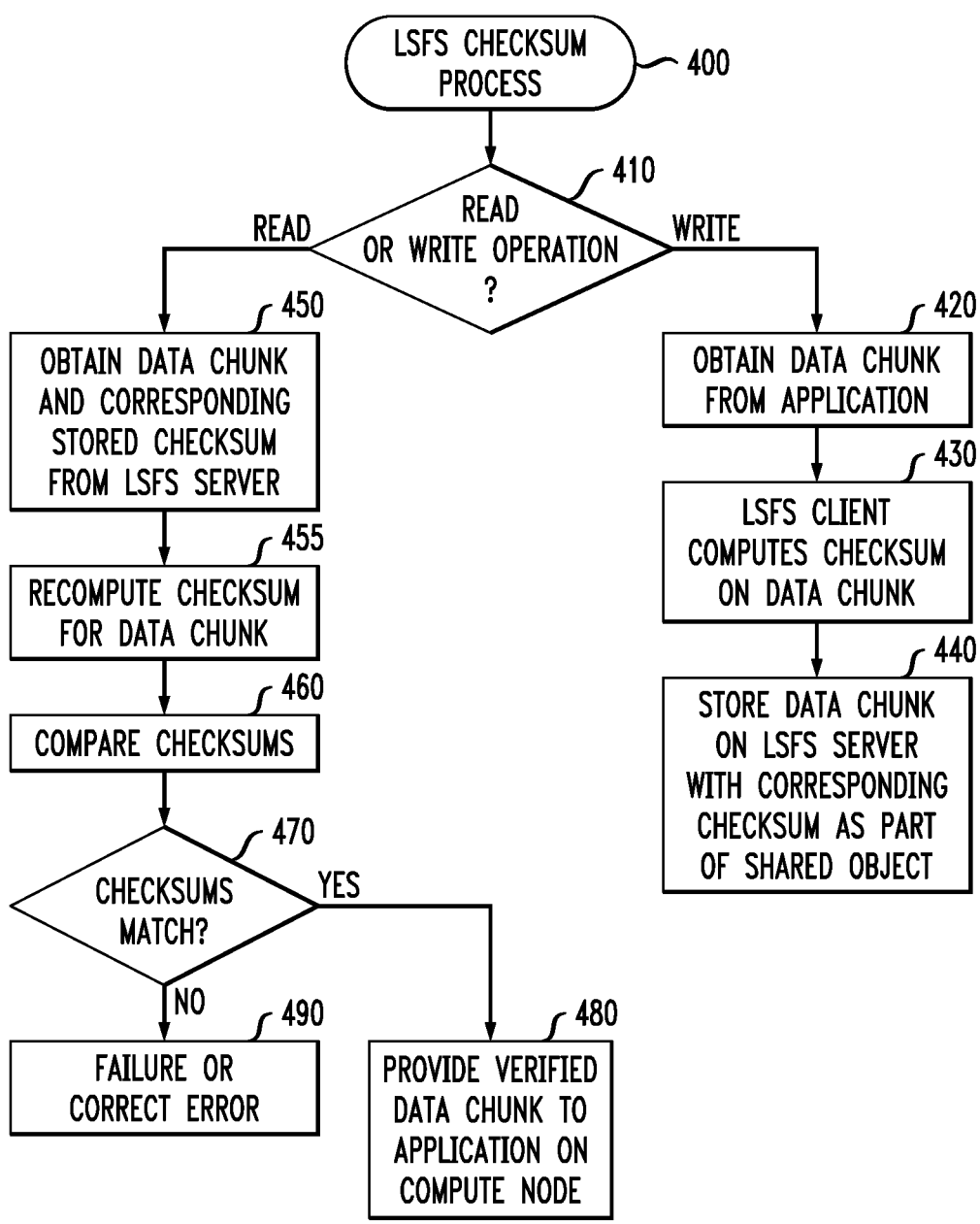
FIG. 4 is a flow chart describing an exemplary LSFS checksum process incorporating aspects of the present invention.

FIG. 4 is a flow chart describing an exemplary LSFS checksum process 400 incorporating aspects of the present invention. The exemplary LSFS checksum process 400 is implemented by the LSFS clients 205 executing on the compute nodes 210 in the embodiment of FIG. 2 and by the flash-based burst buffer nodes 310 in the embodiment of FIG. 3.

As shown in FIG. 4, the exemplary LSFS checksum process 400 initially performs a test during step 410 to determine if the current operation is a read operation or a write operation. If it is determined during step 410 that the current operation is a write operation, then the exemplary LSFS checksum process 400 obtains the data chunk from the application during step 420. The exemplary LSFS checksum process 400 then computes the checksum for the data chunk during step 430 on the compute nodes 210 or the burst buffer nodes 310. Finally, the data chunk is stored on the LSFS server 240 with the corresponding checksum as part of the shared object 250 during step 440.

If, however, it is determined during step 410 that the current operation is a read operation, then the exemplary LSFS checksum process 400 obtains the data chunk and corresponding stored checksum from the LSFS server 240 during step 450. The checksum is recomputed for the data chunk during step 455 and the checksums are compared during step 460 ($checksum_{recompute}=checksum_{stored}$?).

A test is performed during step 470 to determine if the checksums match. If it is determined during step 470 that the checksums match, then the verified data chunk is provided to the application on the compute node 210 during step 480. If, however, it is determined during step 470 that the checksums do not match, then the exemplary LSFS checksum process 400 indicates a failure to the application or corrects the error and provides corrected data during step 490. For example, when the block being read does not match exactly a block that was checksummed but is comprised of pieces from several blocks, the burst buffer layer 310 can check the checksums from the multiple blocks and recompute a new checksum for the block being read and then send just the block and the checksum to the compute server 210.

Among other benefits, the number of compute servers 210 is at least an order of magnitude greater than the number of storage servers 240 in HPC systems, thus it is much faster to perform the checksum computations on the compute servers 210. In addition, the checksumming is performed on the data chunks 220 as they are being written by the LSFS client 205 as opposed to when they have been placed into the file 250 by the server 240. The chunks 220 in a log-structured file system retain their original data organization whereas in existing approaches, the data in the chunks will almost always be reorganized into file system defined blocks. This can introduce additional latency as the file system will either wait for the blocks to be filled or do the checksumming multiple times each time the block is partially filled.

In this manner, aspects of the present invention leverage the parallelism of concurrent writes to a shared object and the high interconnect speed of parallel supercomputer networks to improve the generation of checksums during a write operation and to use the checksummed data to improve the data integrity on read operations. Aspects of the present invention thus recognize that the log-structured file system eliminates the need for artificial file system boundaries because all block sizes perform equally well in a log-structured file system.

Because PLFS files can be shared across many locations, data processing required to implement these functions can be performed more efficiently when there are multiple nodes cooperating on the data processing operations. Therefore, when this is run on a parallel system with a parallel language, such as MPI, PLFS can provide MPI versions of these functions which will allow it to exploit parallelism for more efficient data processing.

Consider a partial read. For example, assume that a write operation wrote bytes {0-100} and a checksum, C1, was stored with these bytes as computed at write time. If the reader reads bytes {25-75}, then the checksum, C1, does not match those bytes 25-75. So the storage server node 240 can send the entire byte range or recompute a new checksum, C1', for bytes 25-75. The former approach has the disadvantage of sending unnecessary data across the network. The latter approach has the disadvantage of doing the checksum computations on the storage server node 240 instead of the much more scalable compute nodes 210 or burst buffer nodes 310.

In a further variation, the storage server node 240 can also optionally check the checksum as a mechanism to detect data corruption during the network transmission on a write operation from the compute nodes 210 to the storage server node 240. In the event the checksum computed by the storage server node 240 does not match the checksum received from the compute node 210 with the data chunk 220, the data can be re-transmitted to obtain the uncorrupted data.

CONCLUSION

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method performed by a Log-Structured File System client executing on one or more of a compute node and a burst buffer node in a parallel computing system for storing a data chunk generated by said parallel computing system to a shared data object on a storage node in said parallel computing system, comprising:
   processing said data chunk generated by said parallel computing system using said Log-Structured File System client, wherein said Log-Structured File System client executes on one or more of said compute node and said burst buffer node in said parallel computing system;
   determining, by said Log-Structured File System client, a checksum value for said data chunk as said data chunk is written by said Log-Structured File System client to said storage node, wherein a plurality of other Log-Structured File System clients determine a plurality of checksums for a corresponding plurality of other data chunks of said shared data object in parallel; and
   providing, by said Log-Structured File System client, said checksum value with said data chunk to said storage node for storage as part of said shared object, wherein said storage node stores said data chunk with said corresponding checksum value as part of said shared object with said plurality of checksums for said corresponding plurality of other data chunks of said shared data object, and wherein said shared object is shared by a plurality of distributed processes in said parallel computing system.

2. The method of claim 1, wherein said storage node comprises a Log-Structured File server.

3. The method of claim 1, wherein said storage node is part of a log structured virtual parallel file system.

4. The method of claim 1, wherein said storage node is part of a Parallel Log-Structured File System (PLFS).

5. The method of claim 1, further comprising the step of evaluating said checksum value when said data chunk is read from said storage node.

6. The method of claim 5, further comprising the step of recomputing said checksum value when said data chunk is read from said storage node and comparing said recomputed checksum value to said stored checksum value.

7. The method of claim 6, further comprising the step of providing a verified data chunk if said corresponding checksum values match.

8. The method of claim 6, further comprising the step of correcting said data chunk if said corresponding checksum values do not match.

9. A tangible machine-readable recordable storage medium for storing a data chunk generated by a parallel computing system to a shared data object on a storage node in said parallel computing system, wherein one or more software programs when executed by one or more processing devices implement the steps of the method of claim 1.

10. A compute node apparatus in a parallel computing system for executing a Log-Structured File System client that stores a data chunk generated by said parallel computing system to a shared data object on a storage node in said parallel computing system, said compute node apparatus comprising:
   a memory; and
   at least one hardware device operatively coupled to the memory and configured to:
   process said data chunk generated by said parallel computing system using said Log-Structured File System client, wherein said Log-Structured File System client executes on one or more of said compute node and said burst buffer node in said parallel computing system;
   determine, by said Log-Structured File System client, a checksum value for said data chunk as said data chunk is written by said Log-Structured File System client to said storage node, wherein a plurality of other Log-Structured File System clients determine a plurality of checksums for a corresponding plurality of other data chunks of said shared data object in parallel; and
   provide, by said Log-Structured File System client, said checksum value with said data chunk to said storage node for storage as part of said shared object, wherein said storage node stores said data chunk with said corresponding checksum value as part of said shared object with said plurality of checksums for said corresponding plurality of other data chunks of said shared data object, and wherein said shared object is shared by a plurality of distributed processes in said parallel computing system.

11. The apparatus of claim 10, wherein said storage node comprises a Log-Structured File server.

12. The apparatus of claim 10, wherein said apparatus comprises one or more of a compute node and a burst buffer node.

13. The apparatus of claim 10, wherein said at least one hardware device is further configured to evaluate said checksum value when said data chunk is read from said storage node.

14. The apparatus of claim 13, wherein said at least one hardware device is further configured to recompute said checksum value when said data chunk is read from said storage node and comparing said recomputed checksum value to said stored checksum value.

15. The apparatus of claim 14, wherein said at least one hardware device is further configured to provide a verified data chunk if said corresponding checksum values match.

16. The apparatus of claim 14, wherein said at least one hardware device is further configured to correct said data chunk if said corresponding checksum values do not match.

17. A method performed by a Log-Structured File System server node in a parallel computing system for storing a data chunk as a shared object, comprising:
   receiving, by said Log-Structured File System server, said data chunk with a corresponding checksum value from a Log-Structured File System client on a compute node in said parallel computing system, wherein said data chunk is generated by said parallel computing system using said Log-Structured File System client, and wherein said corresponding checksum value is generated by said Log-Structured File System client as said data chunk is written by said Log-Structured File System Client, wherein a plurality of other Log-Structured File System Clients determine a plurality of checksums for a corresponding plurality of other data chunks of said shared data object in parallel; and
   storing, by said Log-Structured File System server, said received data chunk and said corresponding checksum value to a shared data object on said storage node, wherein said storage node stores said data chunk with said corresponding checksum value as part of said shared object with said plurality of checksums for said corresponding plurality of other data chunks of said shared data object, and wherein said shared object is shared by a plurality of distributed processes in said parallel computing system.

18. A tangible machine-readable recordable storage medium for storing a data chunk as a shared object in a parallel computing system, wherein one or more software programs when executed by one or more processing devices implement the steps of the method of claim 17.

19. A Log-Structured File System server apparatus in a parallel computing system for storing a data chunk as a shared object, said storage node apparatus comprising:
   a memory; and
   at least one hardware device operatively coupled to the memory and configured to:
   receive, by said Log-Structured File System server, said data chunk with a corresponding checksum value from a Log-Structured File System client on a compute node in said parallel computing system, wherein said data chunk is generated by said parallel computing system using Log-Structured File System client, and wherein said corresponding checksum value is generated by said Log-Structured File System client as said data chunk is written by said Log-Structured File System Client, wherein a plurality of other log-structured file system clients determine a plurality of checksums for a corresponding plurality of other data chunks of said shared data object in parallel; and
   store, by said Log-Structured File System server, said received data chunk and said corresponding checksum value to a shared data object on said storage node, wherein said storage node stores said data chunk with said corresponding checksum value as part of said shared object with said plurality of checksums for said corresponding plurality of other data chunks of said shared data object, and wherein said shared object is shared by a plurality of distributed processes in said parallel computing system.

20. The method of claim 17, further comprising the step of providing said data chunk and said corresponding checksum value to a Log-Structured File System client when said data chunk is read.

* * * * *